United States Patent [19]
Thorwall et al.

[11] Patent Number: 5,257,796
[45] Date of Patent: Nov. 2, 1993

[54] INTEGRATED CAM LEVER/HANDLE LOCK FIFTH WHEEL

[75] Inventors: Gregory R. Thorwall; Gerald W. Hungerink; John T. Buckley, all of Holland, Mich.

[73] Assignee: Holland Hitch Company, Holland, Mich.

[21] Appl. No.: 857,782

[22] Filed: Mar. 26, 1992

[51] Int. Cl.$^5$ .......................................... B62D 53/12
[52] U.S. Cl. ................................... 280/434; 280/509
[58] Field of Search ............... 280/434, 437, 508, 509, 280/510

[56] References Cited

U.S. PATENT DOCUMENTS

| | | | |
|---|---|---|---|
| 2,610,069 | 9/1952 | Ketel | 280/434 |
| 2,663,575 | 12/1953 | Ketel | 280/435 |
| 3,079,175 | 2/1963 | Walther | 280/434 |
| 3,888,514 | 6/1975 | Klein | 280/434 |
| 4,447,070 | 5/1984 | Inoue | 280/434 |
| 4,659,101 | 4/1987 | Buckley | 280/434 |

*Primary Examiner*—David M. Mitchell
*Assistant Examiner*—Andrew C. Pike
*Attorney, Agent, or Firm*—Price, Heneveld, Cooper, DeWitt & Litton

[57] ABSTRACT

A fifth wheel hitch has a single swinging jaw, i.e., pivotal lock element, a unique cam arm, a locking plunger, a release arm, and release handle that all specially function in an interrelated manner to clearly indicate the locked or unlocked condition of the lock element. The release handle has special notches for cooperative interengagement with the top plate, specifically a lock notch and an unlock notch, engageable with a flange of the fifth wheel plate to cause the release handle to be located in specific positions. A cam surface on a finger of the pivotal lock element operates the novel cam arm to shift the release arm, for shifting it out of the unlock notch when the fifth wheel uncouples from the kingpin. The cam arm is held over center when the jaw is open, preventing the jaws from closing until the kingpin enters. When the release handle is pulled to release the locking plunger, the lock notch engages the top plate to retain the pull handle until released from this notch.

14 Claims, 3 Drawing Sheets

INTEGRATED CAM LEVER/HANDLE LOCK FIFTH WHEEL

BACKGROUND OF THE INVENTION

This invention relates to fifth wheel hitches. A common feature of fifth wheel hitches of various types which have been employed for decades is the use of one or more shiftable locking jaws to close the throat of the fifth wheel top plate. Two popular variations are set forth in expired U.S. Pat. Nos. 2,610,069 and 2,663,575 to Ketel. The structure in the '069 patent has the pair of pivotal jaws interengaged by special gear teeth. A locking plunger is shown to reciprocally slide into a position locking the two jaws closed. Another plunger arrangement for locking the two jaws is set forth in U.S. Pat No. 4,106,793 to Neff. It is common to have a pull handle interconnected to the locking plunger, to retract the plunger and thereby allow the driver to release the jaws from the kingpin. This release handle typically has a cam track and cam follower for shifting the locking plunger or dog.

U.S. Pat. No. 4,659,101 to Buckley discloses a fifth wheel hitch having a fixed jaw and a swinging jaw, with the swinging jaw including a closure finger projecting horizontally into the throat of the hitch so as to be engaged by the enlarged lower head of the entering kingpin for closure of the jaws. That fifth wheel hitch also has a locking plunger to retain the jaws closed and biased toward the locked position. The plunger is cammable to a release position by a slide cam plate. The adjustment mechanism for the plunger incorporates a wedge movable transversely of the hitch.

SUMMARY OF THE INVENTION

An object of this invention is to provide a fifth wheel hitch having a single swinging jaw, i.e., pivotal lock element, a unique cam arm, a locking plunger, a release arm, and release handle that all specially function in an interrelated manner to clearly indicate the locked or unlocked condition of the lock element. The release handle has special notches for cooperative interengagement with the top plate, specifically a lock notch and an unlock notch, engageable with the fifth wheel plate to cause the release handle to be located in specific positions. A cam surface on a finger of the pivotal lock element operates the novel cam arm in a fashion to shift the release arm, for shifting it out of the unlock notch when the fifth wheel uncouples from the kingpin. The cam arm is held over center when the jaw is open, preventing the jaws from closing until the kingpin enters. When the fifth wheel is recoupled, the kingpin rotates the lock. The cam follows the finger on the lock with precise timing and allows the plunger to engage behind the lock and the release handle to position itself to engage in the lock notch with the top plate.

These and other objects, advantages, and features of the invention will become apparent upon studying the following specification in conjunction with the drawings.

As to the terminology used herein, the term "longitudinal of the hitch" refers to the fore-to-aft dimension of the hitch, while the terminology "transversely of the hitch" refers to the side-to-side dimension. The terms "forward" and "rearward" or "front end" and "rear end" are in reference to the normal positioning of the hitch on a truck tractor. The term "horizontal" encompasses the usual somewhat tilted positions of a hitch in use.

DESCRIPTION OF THE PREFERRED EMBODIMENT

Figures 1, 2:
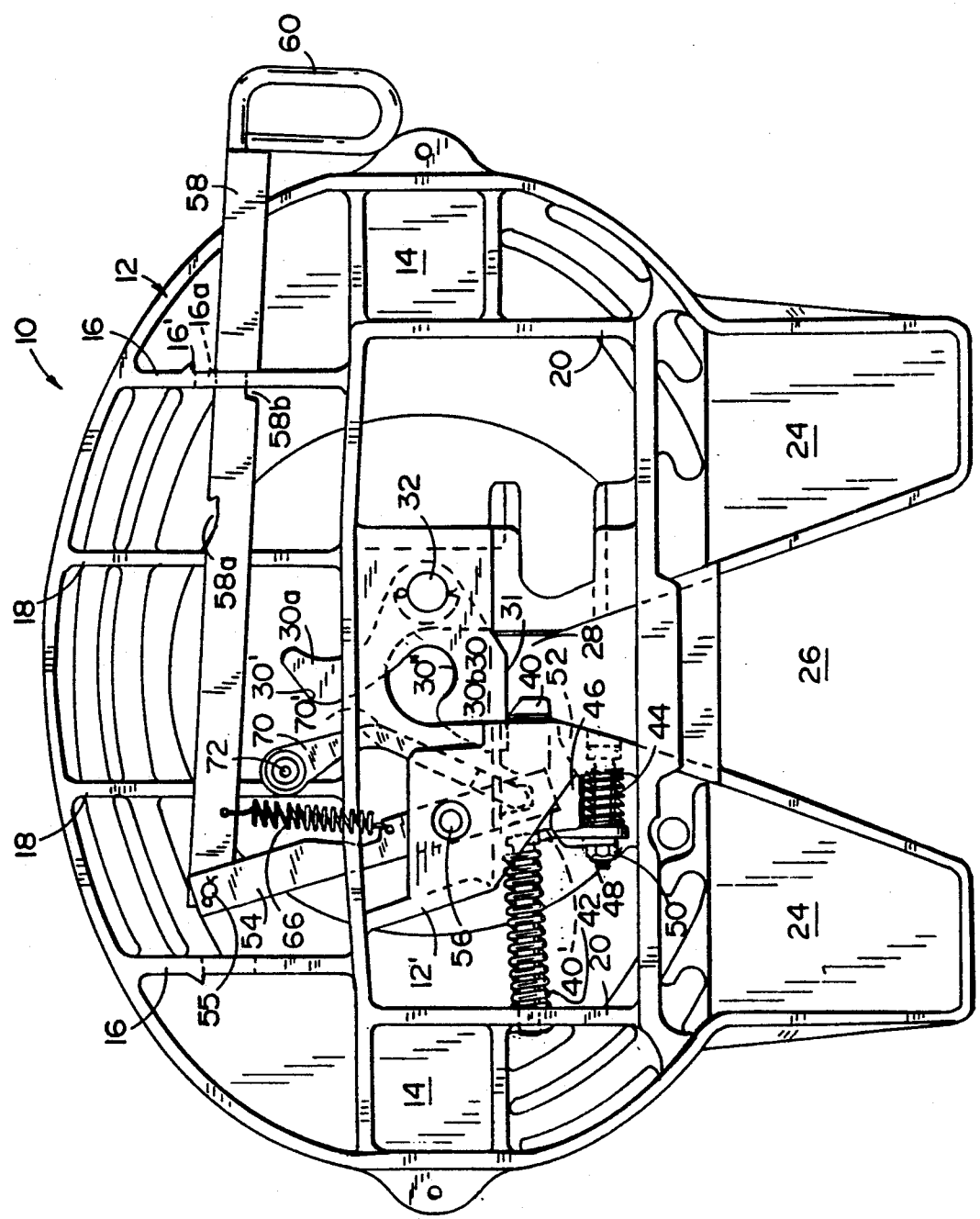
FIG. 1 is a bottom view of the novel fifth wheel hitch showing the lock closed and locked, and the pull handle latched in the lock condition.
FIG. 2 is a side elevational view of the hitch in FIG. 1.

Referring now specifically to the drawings, the fifth wheel hitch 10 there depicted includes a top plate 12 of generally conventional type, having a convex forward end and a bifurcated rear, as well as a pair of laterally spaced trunnions 14 for pivotally mounting the top plate and thereby enabling it to tilt from the true horizontal but remain in a generally horizontal orientation. In FIG. 1 is illustrated the bottom of the top plate which includes a plurality of downwardly protruding, transverse and fore-to-aft flanges 16, 18, 20, et seq., which rigidify the hitch and also support and cooperate with other components in a manner to be described hereinafter. The top 22 of plate 12 has a conventional slide surface. The rear end has bifurcated portions 24 which define a forwardly extending mouth 26 therebetween, terminating in a deadend throat 28 to receive the kingpin.

Figure 3:
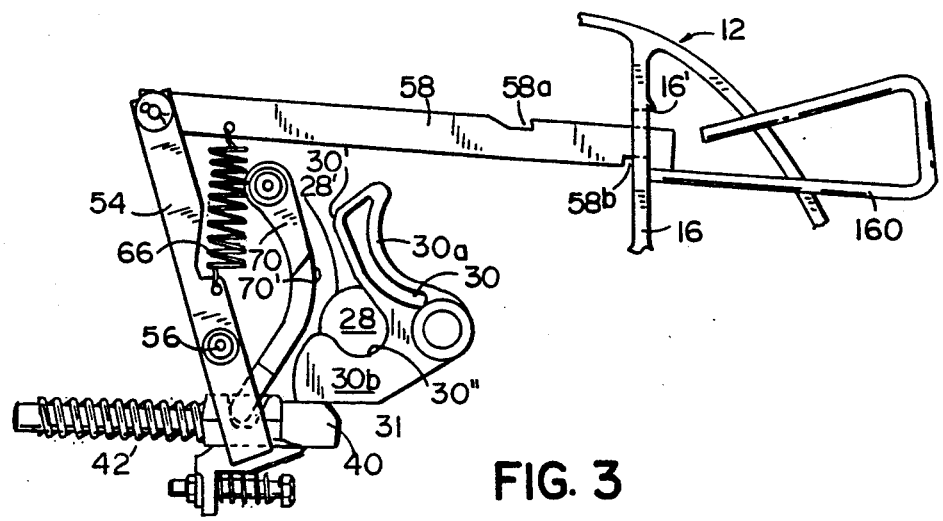
FIG. 3 is an enlarged, fragmentary view of the movable components in the hitch, showing the locks closed.

Adjacent to the throat 28 is a pivotal, generally V-shaped lock element or jaw 30 bifurcated into two integral branches 30a and 30b and pivotally mounted at the apex between these two branches to a vertical pivot pin 32 fixed to plate 12. Branch 30b is a locking branch while branch 30a will be called a finger branch. Pivot pin 32 is laterally offset from the deadend portion of throat 28. Jaw 30 pivots on pin 32 between the closed lock position across the throat as shown in FIGS. 1 and 3 and the fully open position shown in FIG. 7. Lock element 30 has a concave recess between branches 30a and 30b to cooperate with the concave forward end of throat 28 and thereby cylindrically surround the neck or shoulder of a kingpin. Branch 30b is generally rearwardly of the axis of pivot pin 32 while branch 30a is generally forwardly of this axis, except in the fully open position of the lock element.

The first forward branch 30a comprises a protruding finger which has a camming surface 30' near the outer end thereof. The second rearward branch 30b includes the concave kingpin lock surface 30" on its inner face and a lock plunger engagement surface 31 on its outer rear surface. A locking plunger 40 is laterally reciprocal from a retracted condition against the bias of a coil spring 42 around the shaft of the plunger between the plunger head and flange 20. In the fully extended position of the plunger, it engages surface 31 of lock element 30 to lock this lock element in closed position around the kingpin Spring 42 biases the plunger to this extended locking condition. Any wear between the plunger and the lock element is compensated for by a wedge 46 biased by spring 44 toward a wedging action on the plunger, in conventional fashion. Wedging element 46 has an L-shaped configuration with one flange thereof being positioned on stud 48, with nut 50 limiting movement of the wedging element with a retracting plunger. The wedging element rides against a sloping surface of fixed wedge 52 in conventional fashion.

A hitch release arm or lever 54 is pivotally mounted on vertical pin 56 to top plate 12. This release arm extends through a slot in plunger 40 such that retraction of plunger 40 causes pivoting of release arm 54 in one direction and extension causes pivoting of release arm 54 in the opposite direction. In the illustrated embodiment, the unit is so-called "left handed" and thus the release handle 54 is pivotally mounted between its ends. The invention will therefore be described relative to this left-handed model. If a right-handed unit is employed, release handle 54 will be pivotally mounted on its rearward end, i.e., beyond the plunger so that, in either version, a pulling action on the release handle will cause release arm 54 to pivot in the same way. These are equivalent arrangements.

In the left-handed version illustrated, one end of release arm 54 is in the slot of plunger 40, while the opposite forward end is pivotally engaged at pin 55 to an elongated plate type release handle 58. Release handle 58 extends laterally beyond trunnion 14 for potential manual engagement of a grip 60 mounted on the outer end of handle 58. (This hand grip can be of different configurations such as that noted at 60 in FIG. 1 and 160 in FIGS. 3–7.) Handle 58 extends through a slot 16a in flange 16 and has a pair of notches engageable with the flange. More specifically, handle 58 includes an unlock position notch 58a and a lock position notch 58b, on opposite sides of handle 58 and at different linear locations along the handle. Notch 58b is closer to the outer end of handle 58 than notch 58a. Unlock notch 58a is slated and engagable with a like slated projection or tooth 16' on the edge of slot 16a of flange 16, to retain the handle in engaged position with the flange until the handle is moved slightly linearly outwardly, sufficient for a coiled tension spring 66 to pull handle 58 away from extension 16' and reset the lock. Coil spring 66 has one end attached to handle 58 and the opposite end attached to release arm or lever 54, biasing release handle 58 toward arm 54.

Also pivotally mounted to top plate 12 is a special elongated cam arm 70. It is positioned between lock element 30 and release arm 54. This cam arm is pivotally mounted at its forward end on a pivot pin 72. It has a generally dog-leg shaped configuration with a cam follower surface 70' at the apex intermediate its ends, and has its rearward end projecting into a slot 40' in plunger 40, to move with the plunger and the rearward end of release arm 54. Thus, cam arm 70 will be moved with the plunger when the release arm and release handle are manually actuated to unlock the locking jaw element 30. Likewise, when plunger 40 is biased by spring 42 to an extended position, release arm 54 and cam 70 will move therewith. Further, the cam also has a special relationship to the locking element 30, as well as to the release arm and handle as just noted. More specifically, cam surface 30' on finger 30a of lock element 30 will, when lock element 30 is rotated, engage cam surface 70' of cam element 70 to thereby shift the cam element away from the throat of the hitch, tending to retract plunger 40 slightly and also to shift release arm 54 and release handle 58 in a manner to be described hereinafter. These above described components operate effectively and uniquely together during a hitching operation to a kingpin, and also during the unhitching operation.

During an unhitching operation, and referring specifically initially to FIGS. 1 and 3, the kingpin will initially be in the deadend of throat 28, secured between concave throat surface 28' and concave locking element surface 30", with plunger 40 being in extended condition engaging surface 31 of the lock element. In this locked condition, release handle 58 is in its retracted position and has lock notch 58b in engagement with latch flange 16 of top plate 12. Tension spring 66 between release arm 54 and release handle 58 retains the notch 58b in engagement with flange 16. In this position of release arm 54, plunger 40 is in full engagement with surface 31, biased by compression spring 42, to retain the fifth wheel in locked relationship with the kingpin. The closed locked condition is plainly and quickly visible by a glance at the position of the release handle.

Figure 4:
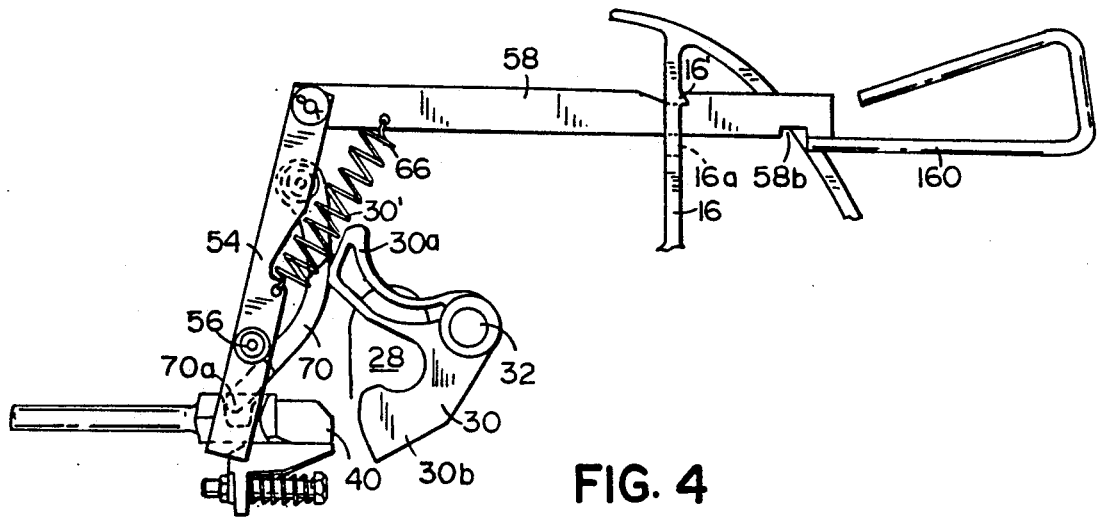
FIG. 4 is a fragmentary, enlarged view of the components in FIG. 3, showing the lock released and beginning to open, and the pull handle extended and in the latched unlock condition.
Figure 5:
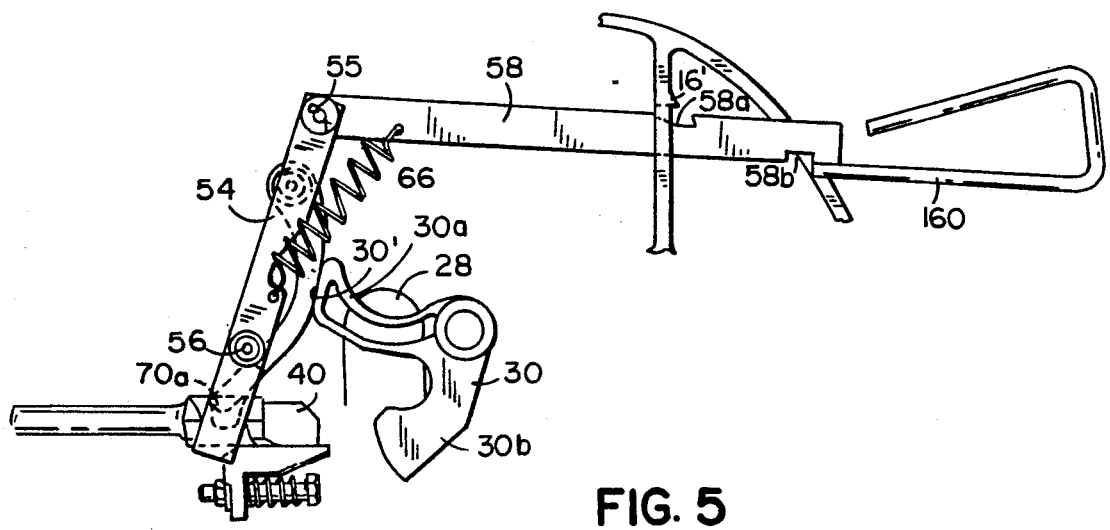
FIG. 5 is an enlarged, fragmentary view of the components in FIGS. 3 and 4, showing the lock partially open, and the pull handle extended but not latched.
Figure 6:
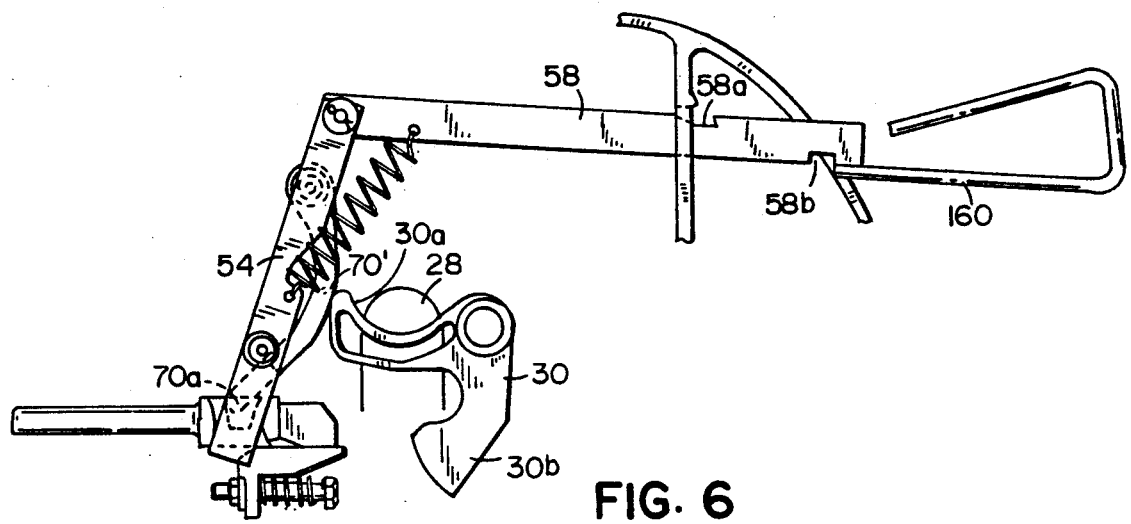
FIG. 6 is an enlarged, fragmentary view of the components in FIGS. 3-5, showing the lock mostly open.
Figure 7:
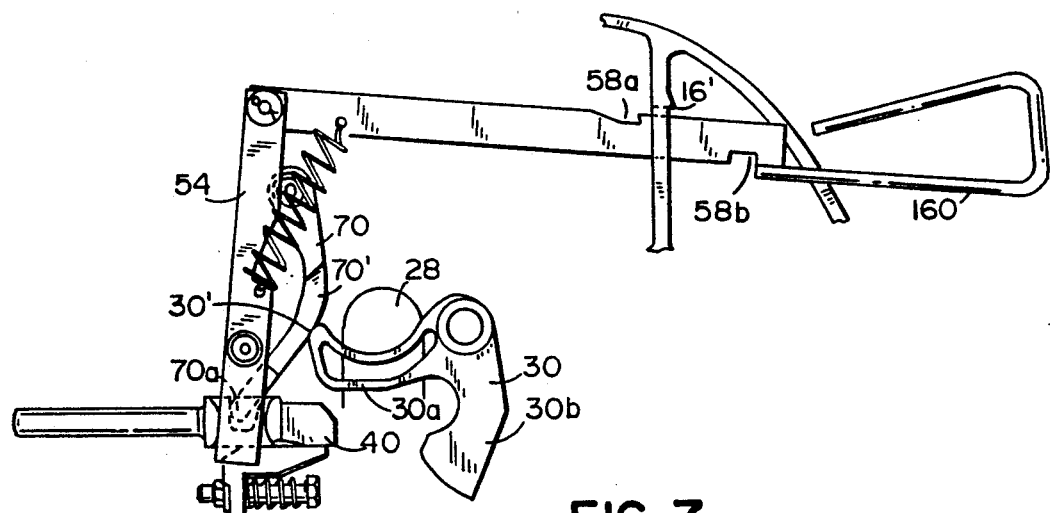
FIG. 7 is an enlarged, fragmentary view of the components in FIGS. 3-6, showing the look fully open.

To unlock the hitch, the operator manually grabs grip 60 (or modified grip 160, FIGS. 3–7), shifts the grip and release handle forwardly of the hitch to shift the notch 58b away from and out of engagement with flange 16, and pulls release handle 58 laterally to an extended condition as in FIG. 4, and then shifts release handle 58 toward the front of the hitch to engage notch 58a with flange 16 and projection 16' which prevents tension spring 66 from pulling release handle 58 away from its engagement with flange 16. This pulling action pivots release arm 54 about its pivot pin 56, thereby retracting plunger 40 from throat 28 of the fifth wheel top plate, against the bias of compression coil spring 42. (For clarity of the drawings, spring 42 is not depicted in FIGS. 4–7 and spring 66 is depicted in graphic form.) The truck tractor then can begin to move away from the trailer to withdraw the upwardly oriented fifth wheel hitch from the depending kingpin on the trailer. The kingpin thus pivots lock element 30 about its pivot pin 32 as shown in sequential drawing FIGS. 4, 5, 6, and 7. As lock element 30 pivots rearwardly to open, cam surface 30' on finger 30a engages cam follower surface 70' on cam arm 70, causing the rearward end 70a of cam arm 70 to retract plunger 40 a small amount more against its coil spring, and to shift release arm 54 more about its pivot pin and shift release handle 58 axially to a somewhat further extended position causing release of notch 58a from flange 16 and projection 16' (FIG. 5). This allows spring 66 to pull release handle 58 rearwardly, disengaging it from flange 16. As lock element 30 moves further toward its fully open position, cam surface 30' moves past the convex center of cam follower surface 70', as depicted in FIGS. 6 and 7, allowing cam arm 70 to be moved back toward the throat under the influence of compression spring 42 on plunger 40. This movement enables release arm 54 to move back slightly and release handle 58 to move slightly, displacing notch 58a from flange 16 (FIG. 7). The lock is then fully open allowing full release of the kingpin. The open, unlocked condition of the hitch is readily and quickly visible from the position of handle 58.

Moreover, the over center position of cam surface 30' of jaw 30 relative to cam arm 70, and specifically surface 70' thereof, causes the lock to remain fully open and not accidentally close so that another entering kingpin, during attempted hookup, will not damage a closed lock element, but rather will allow and assure smooth hookup.

During the hookup operation, the elements move generally in reverse to what has previously been described above. More specifically, the entering kingpin engages the back side of finger 30a, rotating locking element 30 about its pivot pin, simultaneously causing cam surface 30' to move along cam follower surface 70' on cam arm 70, with the lock element moving from the condition in FIG. 7 to that in FIG. 6, FIG. 5, FIG. 4, and FIG. 3. As this occurs, the nose of branch 30b ultimately engages the end of the plunger to give it a slight further retraction by pushing it laterally, following which the nose of branch 30b moves past the plunger, allowing the plunger to slam into its fully extended locking condition depicted in FIGS. 1 and 3. When this occurs, the plunger carries release arm 54 and release handle 58 with it, pivoting the release arm about its pivot pin and retracting release handle 58 to its position aligning notch 58b with flange 16, and in this condition spring 66 pulls the notch into engagement with the flange.

It will be noted that the position of the pull handle enables the operator to readily see whether the hitch is effectively locked or is in open condition. The cam arm 30 operates uniquely with the handle and release arm, as well as the plunger, to assure proper operation.

As noted previously, the unit can be either right or left handed, with the release arm or lever being pivoted on the rearward end for a right handed arrangement and in the middle as depicted for a left handed arrangement. In either case, the cam arm cooperates uniquely with the notches in the handle to assure that the element remains in the fully open position for reception of a kingpin, or fully locked position until manually released. Besides this variation, it is conceivable that those skilled in the art, once this invention has been reviewed, will consider various minor ways to alter it in order to suit particular circumstances or installations. An example is the use of a different latch mechanism for the release handle. The invention is therefore not intended to be limited to the specific preferred embodiment depicted as illustrative, but only by the scope of the appended claims and the reasonably equivalent structures to those defined therein.

The embodiments of the invention in which an exclusive property or privilege is claimed are defined as follows.

We claim:

1. A fifth wheel hitch comprising:
   a fifth wheel top plate having an upper surface, a pair of trunnions on opposite sides thereof, and a bifurcated rear forming a pair of rearwardly extending projections astraddle a tapered entering mouth and a deadend throat for receiving a cooperative kingpin;
   a hinged lock element adjacent said throat being generally V-shaped with a first locking branch and a second branch integrally joined at an apex therebetween and pivotally mounted to said top plate at said apex of said lock element, said lock element being pivotally shiftable between a closed, lock position with said locking branch across a rear of said throat, and an open, unlock position with said locking branch substantially clear of said throat and said second branch across a front of said throat, said second branch having a cam nose;
   a locking plunger shiftable between an extended locking position engaging said locking branch to lock said lock element in closed, lock position, and a retracted unlocking position releasing said lock element, said locking plunger being biased toward said extended position;
   a cam arm pivotally mounted to said plate at one end of said cam arm, engageable with said locking plunger at a second end of said cam arm, and having a cam follower surface intermediate said ends and engageable by said cam nose of said second branch of said lock element;
   a release arm pivotally mounted to said top plate and engaging said locking plunger to shift therewith; and
   a release handle connected to said release arm and having first latching means for latching engagement of said release arm with said top plate when said locking plunger is in said extended locking position, and second latching means for latching engagement of said release arm with said top plate when said locking plunger is in said retracted unlocking position;
   said cam arm being positioned to be shifted by said locking plunger during unlocking movement of said plunger for shifting of said release arm and said release handle.

2. The fifth wheel hitch in claim 1 wherein said first latching means on said release handle is a lock notch latchingly engageable with said top plate, and said second means on said release handle is an unlock notch latchingly engageable with said top plate.

3. The fifth wheel hitch in claim 2 wherein said top plate includes a latch flange separately engageable by each of said notches.

4. The fifth wheel hitch in claim 3 wherein said release handle has an outer end grip, and said lock notch and said unlock notch are spaced from each other along said release handle, with said lock notch being closer to said outer end grip.

5. The fifth wheel hitch in claim 4 further including a tension spring arm attached to said release handle and positioned to bias said unlock notch out of engagement with said top plate.

6. The fifth wheel hitch in claim 1 wherein said cam arm is elongated and is positioned between said lock element and said release arm.

7. The fifth wheel hitch in claim 6 wherein said elongated cam arm is of dog-leg configuration, having said cam follower surface on an apex thereof.

8. A fifth wheel hitch having a bifurcated top plate defining a kingpin-receiving throat, the fifth wheel hitch comprising:
   a lock element pivoted across said throat, and pivotal away from said throat;
   a shiftable lock plunger for locking said lock element across said throat;
   a shiftable cam arm engageable by and shiftable by said lock element when said lock element is pivoting relative to said throat;
   said top plate having a latch flange;
   a release arm interengaged with said cam arm and said plunger whereby all three shift together; and a release handle connected to said release arm, and having an unlock notch engageable with said latch flange when said release handle is pulled to shift said release arm and retract said lock plunger;

said lock element, when pivoted away from said throat by a departing kingpin, being engageable with said shiftable cam arm to shift said release handle unlock notch away from said latch flange.

9. The fifth wheel hitch in claim 8 wherein said cam arm is elongated, being pivotally mounted to said top plate.

10. The fifth wheel hitch in claim 9 wherein said cam arm is pivotally mounted at one end thereof to said top plate.

11. The fifth wheel hitch in claim 10 wherein said lock element has a first locking branch for extending across said throat, and a second branch shiftable in opposite directions by a kingpin entering and departing said throat, and said cam arm is shiftable by said second branch.

12. The fifth wheel hitch in claim 11 further including a spring biasing said release handle toward release of said unlock notch from said latch flange.

13. The fifth wheel hitch in claim 12 wherein said latch flange has a configuration retaining said release handle unlock notch in engagement with said latch flange until said release handle is shifted axially.

14. A fifth wheel hitch comprising:

a pair of trunnions;

a top plate pivotally mounted on said trunnions, and having a rearwardly oriented kingpin-receiving mouth terminating in a throat;

a pivotal lock element adjacent said throat, to open and close said throat, bifurcated into first and second integral branches, and pivotally mounted between said integral branches;

a kingpin engagement, lock-closing finger on said first branch;

a camming surface near an outer end of said finger;

a kingpin lock surface on said second branch, shiftable between an unlock position and a lock position, said kingpin lock surface closings said throat when in said lock position;

a lock-plunger-engagement surface on said second branch;

a locking plunger shiftable between a retracted, unlock position and an extended lock position engaging said lock-plunger-engagement surface and biased toward said lock position;

an elongated cam arm having ends and pivotally mounted to said top plate, a cam follower surface between said ends being cooperable with said camming surface on said finger;

one end of said cam arm engaging said plunger to move therewith;

a release arm with first and second ends, pivotally mounted to said top plate, and engaging said locking plunger on said first end of said release arm;

a release handle pivotally attached to said second end of said release arm and having first and second notches, said first notch being engageable with said top plate in said lock position of said kingpin lock surface, and said second notch being engageable with said top plate in said unlock position of said kingpin lock surface; and gripping means for manually shifting said release handle and thereby shifting said locking plunger to said unlock position thereof;

said cam arm being operable by said release arm;

said cam arm being positioned to be shifted by unlocking movement of said locking plunger, and said cam arm being positioned to be engaged at said cam follower surface by said camming surface on said lock-closing finger of said lock element to shift said release arm and thereby disengage said second notch of said release handle from said top plate; and said cam arm being positioned to cause said camming surface to move past center of said cam arm for retaining said pivotal lock element open until again engaged by a kingpin

* * * * *

UNITED STATES PATENT AND TRADEMARK OFFICE
CERTIFICATE OF CORRECTION

PATENT NO. : 5,257,796
DATED : Nov. 2, 1993
INVENTOR(S) : Gregory R. Thorwall et al It is certified that error appears in the above-indentified patent and that said Letters Patent is hereby corrected as shown below:

Column 2, line 23
"look" should be --lock--;

Column 3, line 4
After "kingpin" insert --.--;

Column 3, line 45
"slated" should be --slanted--; (both occurrences)

Column 8, line 1
"closings" should be --closing--;

Signed and Sealed this

Fifth Day of July, 1994

Attest:

BRUCE LEHMAN

*Attesting Officer*   *Commissioner of Patents and Trademarks*